United States Patent
Villaret

(10) Patent No.: US 7,058,427 B2
(45) Date of Patent: Jun. 6, 2006

(54) OPTIMIZING THE CONSUMPTION OF A MULTIMEDIA COMPANION CHIP IN A MOBILE RADIO COMMUNICATIONS TERMINAL

(75) Inventor: Olivier Villaret, Croissy-sur-Seine (FR)

(73) Assignee: TLC Communication Technology Holdings Limited, Kowloon (HK)

( * ) Notice: Subject to any disclaimer, the term of this patent is extended or adjusted under 35 U.S.C. 154(b) by 426 days.

(21) Appl. No.: 10/308,014

(22) Filed: Dec. 3, 2002

(65) Prior Publication Data

US 2003/0109287 A1    Jun. 12, 2003

(30) Foreign Application Priority Data

Dec. 6, 2001   (FR) ................................. 01 15776

(51) Int. Cl.
   *H04B 1/38*   (2006.01)
   *H04M 1/00*   (2006.01)

(52) U.S. Cl. ...................................... 455/566; 455/574

(58) Field of Classification Search ............. 455/550.1, 455/566, 574, 343.1; 345/204
See application file for complete search history.

(56) References Cited

U.S. PATENT DOCUMENTS

| | | | |
|---|---|---|---|
| 4,545,030 A | 10/1985 | Kitchin | |
| 5,058,203 A | 10/1991 | Inagami | |
| 5,142,684 A | 8/1992 | Perry et al. | |
| 6,040,845 A | 3/2000 | Melo et al. | |
| 2004/0029546 A1* | 2/2004 | Tsuchi et al. | 455/159.1 |
| 2004/0192412 A1* | 9/2004 | Ono et al. | 455/574 |

FOREIGN PATENT DOCUMENTS

| | | | |
|---|---|---|---|
| EP | 0677974 A2 | | 10/1995 |
| EP | 1 077 442 A1 | * | 2/2001 |
| WO | WO 9325955 | | 12/1993 |

* cited by examiner

*Primary Examiner*—Nguyen T. Vo
(74) *Attorney, Agent, or Firm*—Sughrue Mion, PLLC

(57) ABSTRACT

A radio communications terminal (10) having a screen (12) controlled by a control module (3) and also at least two different types of microprocessor (1, 2), the first type of microprocessor (1) improving the graphics capabilities of the terminal (10) and driving the control module (3) of the screen (12), the second type of microprocessor (2) handling the other functions of the terminal (10), the terminal being characterized in that in standby mode the first type of microprocessor (1) is deactivated while the second type of microprocessor (2) drives the control module (3) of the screen (12).

14 Claims, 2 Drawing Sheets

OPTIMIZING THE CONSUMPTION OF A MULTIMEDIA COMPANION CHIP IN A MOBILE RADIO COMMUNICATIONS TERMINAL

The present invention relates to a radio communications terminal in which the consumption of a multimedia companion chip (MMCC) integrated in the terminal is optimized so as to increase the battery life of the terminal in standby mode.

The invention thus relates more particularly to the field of telecommunications, and specifically to the field of radio communications terminals of the GSM type (acronym for global system for mobile communications) suitable for implementing multimedia type functions.

BACKGROUND OF THE INVENTION

FIG. 1 shows such a radio communications terminal 10, essentially comprising a receiver antenna 11, a screen 12, typically a liquid crystal display screen, a navigation key 13, and a keypad 14. The terminal 10 also has a battery 15 integrated therein and a connector 16 for connecting the battery to a battery charger. Finally, the terminal 10 has a printed circuit IMP for receiving all of the circuits of the radio communications terminal, which circuits include various types of microprocessor chip.

In conventional architecture for GSM type radio communications terminals, the screen of the liquid crystal display screen type is controlled by a microprocessor implemented on a chip referred to as the "GSM" chip, which enables field bars, battery state, etc. to be displayed on the screen and which may even be able to run games. In addition, in order to implement multimedia type functions via GSM radio communications terminals, there exist special components known as multimedia companion chips (MMCCs). Such components are endowed with very large signal processing capacity in order to enable multimedia applications of the audio or video types, for example, to be handled.

The technical problem which then arises relates to controlling the liquid crystal display screen when an MMCC is integrated in a conventional architecture for GSM terminals. There are now two microprocessors which must cohabit while processing information associated with controlling the screen.

Unfortunately, because companion chips require high display performance, they are connected directly to the screen and it is therefore these components which control access to the screen. It is thus commonly accepted that the MMCC must drive the control module of the liquid crystal display screen of the GSM radio communications terminal. To do this, such components generally possess internal random access memory (RAM) corresponding to the image on the screen and enabling them to process the image.

FIG. 2 shows such an architecture in which a multimedia companion chip 1 is connected to a GSM chip 2 via a serial link, the GSM chip 2 being provided to handle conventional functions associated with the GSM protocol. A parallel bus link is provided to transfer information between the MMCC 1 and a control module 3 which controls the liquid crystal display screen of the mobile radio communications terminal.

Energy saving is of crucial importance for the manufacturers of GSM radio communications terminals, and this involves a particular need to optimize battery life as well as possible for radio communications terminals while they are in standby mode, where standby mode is characterized by the terminal merely listening to the network and not transmitting anything. However, when the mobile radio communications terminal is in standby mode, the liquid crystal display screen needs to be refreshed regularly with information, in particular concerning the state of the network, the state of the battery, etc.

As mentioned above, integrating an MMCC in a GSM radio communications terminal leads to the architecture shown in FIG. 2 in which the screen control module is itself driven by the MMCC.

In the GSM standard, it is specified that the network should be listened to once every 2.5 seconds on average. Thus, when the radio communications terminal is in standby mode, the GSM chip potentially has information for forwarding to the MMCC once every 2.5 seconds.

The MMCC must therefore leave standby mode in order to implement the operation of refreshing the liquid crystal display screen. In all other cases, modes are implemented in which the companion chip is switched off. The companion chip then deactivates all of its non-necessary resources and remains in standby mode.

Nevertheless, compared with the architecture of a conventional mobile radio communications terminal in which the GSM chip drives the liquid crystal display screen directly via its control module, the architecture shown in FIG. 2 for a "intelligent" mobile radio communications terminal in which an MMCC is integrated thus requires its MMCC to be switched on even when the terminal is in standby mode, merely for the purpose of refreshing the liquid crystal display screen.

Thus, the fact of switching on the MMCC together with its memory merely to enable information relating to the state of the network to be displayed on the screen even though the companion chip is specifically designed for processing multimedia type information, has the consequence of considerably increasing energy consumption (in particular because of leakage currents) throughout standby operation during which it is necessary to implement operations of refreshing the screen.

An architecture for a mobile radio communications terminal of the kind shown in FIG. 2 in which the MMCC drives the control module of the liquid crystal display screen thus presents performance that is poor in terms of the energy consumption when the terminal is in standby mode.

OBJECT AND SUMMARY OF THE INVENTION

Consequently, an object of the present invention is to mitigate the drawbacks of the prior art as mentioned above by proposing an improvement to the architecture shown in FIG. 2, so as to endow a GSM type radio communications terminal that is intelligent, i.e. that includes an MMCC, with energy consumption performance in standby mode that is equivalent to the corresponding performance of a standard mobile radio communications terminal.

To this end, the invention provides for avoiding use of the MMCC when the radio communications terminal is in standby mode. Thus, in standby mode where the terminal is not in communication and is merely performing a function of listening to the network, the invention provides for the MMCC to be deactivated and for the liquid crystal display screen then to be refreshed directly by the GSM chip.

The invention thus provides a radio communications terminal comprising a screen controlled by a control module and also at least two different types of microprocessor, said first type of microprocessor improving the graphics capabilities of said terminal and driving said control module of the screen, said second type of microprocessor handling the other functions of said terminal, the terminal being characterized in that in standby mode said first type of microprocessor is deactivated while second type of microprocessor drives said control module of the screen.

BRIEF DESCRIPTION OF THE DRAWINGS

Other characteristics and advantages of the present invention appear more clearly on reading the following description given by way of non-limiting illustration and made with reference to the accompanying figures, in which.

MORE DETAILED DESCRIPTION

Figure 2:
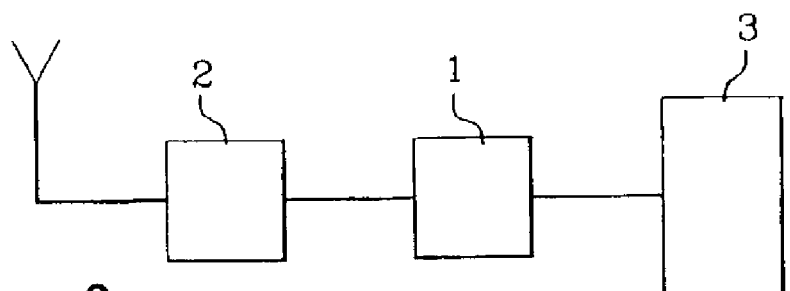
FIG. 2 is a diagram showing the drawbacks associated with integrating an MMCC in a radio communications terminal of standard architecture, and it is described above.
Figure 3:
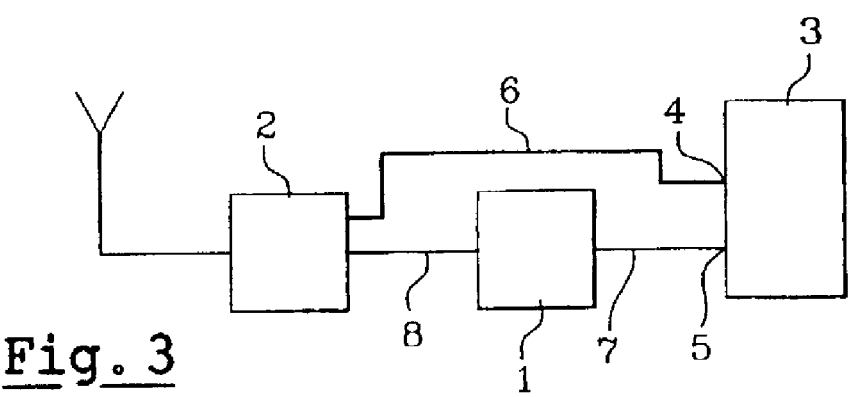
FIG. 3 is a diagram showing a first embodiment of the invention.
Figure 4:
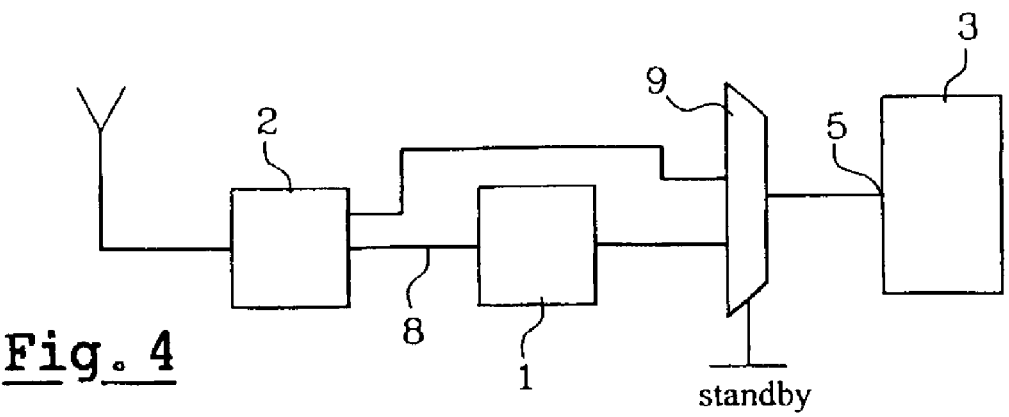
FIG. 4 is a diagram showing a second embodiment of the invention.
Figure 5:
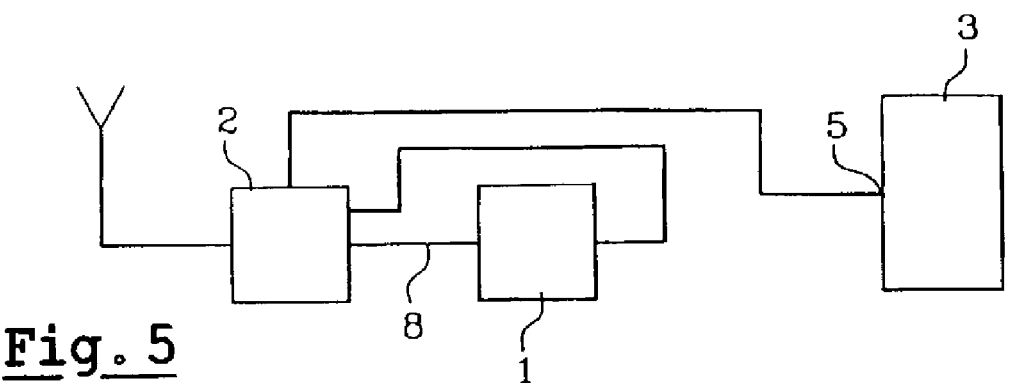
FIG. 5 is a diagram showing a third embodiment of the invention.

FIGS. 3, 4, and 5 show the same elements as those already described with reference to FIG. 2. Thus, FIG. 3 shows a first type of microprocessor 1 implemented on a chip referred to as a multimedia companion chip. The companion chip 1 is specifically dedicated to processing multimedia functions for the terminal in which it is integrated, thus greatly increasing the graphics capabilities of the terminal.

A second type of microprocessor 2 is implemented on another chip referred to as the "GSM" chip. The GSM chip 2 is designed to process the other functions of the radio communications terminal in which it is integrated, and in particular functions associated with handling GSM protocol.

FIG. 3 shows a module 3 for controlling the liquid crystal display screen that has both a serial interface 4 and a parallel interface 5. In this first embodiment of the invention, both types of microprocessor 1 and 2 are each connected to the control module 3 for the liquid crystal display screen. Since the GSM chip 2 has less information to transmit it is connected to the serial interface of the control module 3 via a serial bus link 6, while the MMCC 1 is connected to the parallel interface of the control module 3 via a parallel bus link 7, the GSM chip 2 and the MMCC 1 also being connected to each other by means of a data transmission line 8. At any given instant, it is assumed that there is only one type of microprocessor in charge of the control module of the liquid crystal display screen.

In this configuration, in particular for multimedia type applications, the control module of the liquid crystal display screen is driven by the MMCC 1, the GSM chip being designed to handle the other functions of the terminal. The information relating in particular to displaying field bars, battery status, etc. which are conventionally handled by the GSM chip 2 are then transferred to the companion chip 1 via the data transmission line 8 so that the companion chip 1 controls the display of this information on the screen.

When the terminal switches to standby mode, i.e. when it is merely listening to the network, the user having decided to stop ongoing multimedia applications, the GSM chip 2 becomes the sole master of the screen control module 3 via the serial bus link 6. Thus, in standby mode, only the GSM chip 2 is in operation. Under such circumstances, prior to deactivating the MMCC 1, information must be transferred from the MMCC 1 to the GSM chip 2 via the data transmission line 8 so that the GSM chip can recover the context in which the screen of the terminal was to be found prior to it taking over and driving the screen control module itself.

The MMCC and its memories can thus be deactivated in standby mode, thus making it possible to achieve better performance in terms of energy saving. A deactivation mechanism is thus implemented for sharing the control module of the liquid crystal display screen between the GSM chip while the terminal is in standby mode, and the MMCC in all other cases, thus making it possible to increase the standby battery life of the terminal or at least to make it equivalent to that of a standard radio communications terminal that does not use an MMCC.

Figure 1:
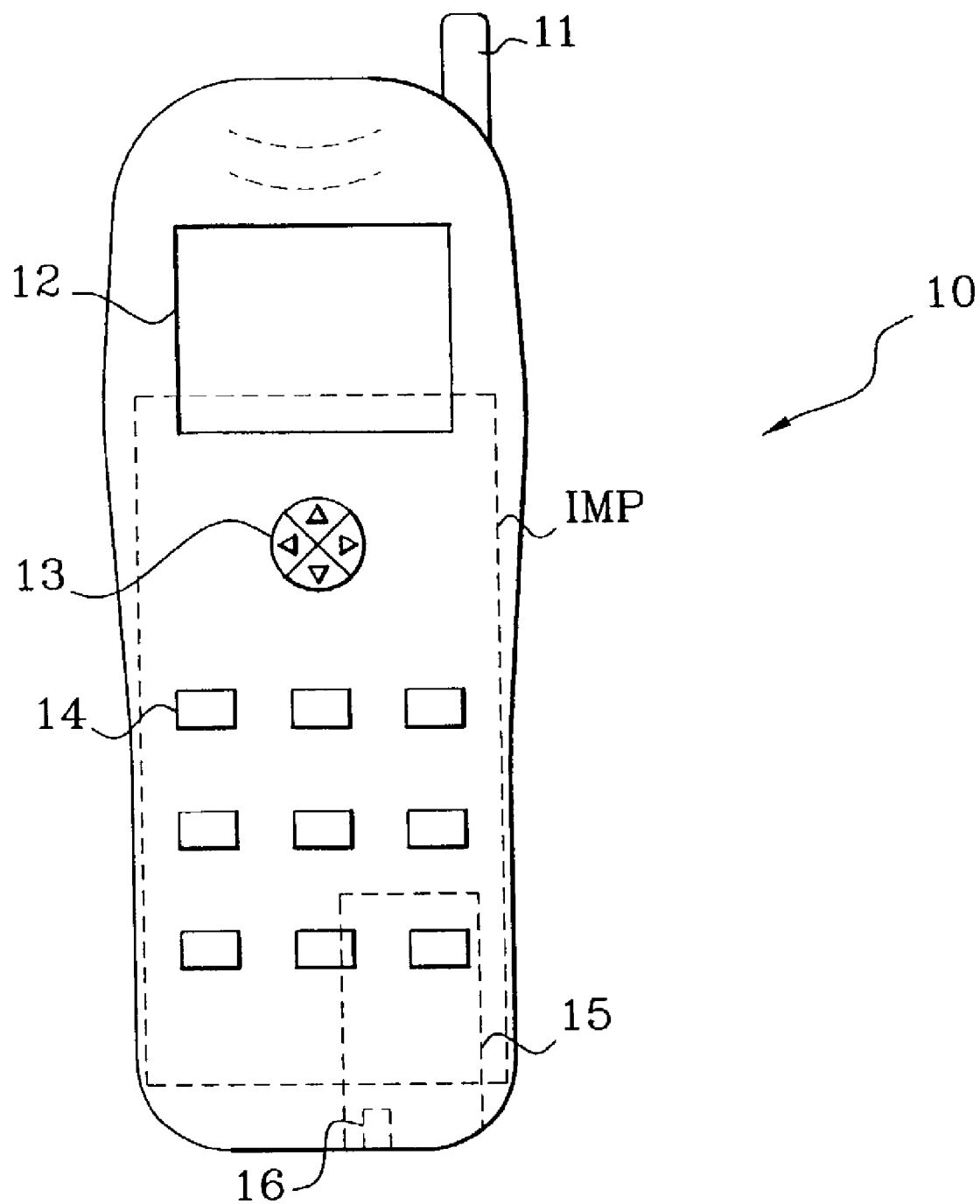
FIG. 1 is a diagram showing a standard radio communications terminal and is described above.

It should be observed that not all control modules for liquid crystal display screens are provided with both types of interface, serial and parallel, as shown in FIG. 1, and that most of them have a parallel interface only. FIG. 4 proposes a particular embodiment of the invention that is capable of adapting to such screen control modules.

The liquid crystal display screen control module 3 of FIG. 4 thus possesses a single parallel interface 5, which implies that only one circuit can be connected thereto.

The architecture of FIG. 4 thus comprises, in addition, an external 2×1 multiplexer 9 whose two inlets are connected respectively to the first type of microprocessor implemented on the MMCC 1, and to the second type of microprocessor implemented on the GSM chip 2, via parallel bus type links. The output from the multiplexer 9 is connected to the parallel interface of the liquid crystal display screen control module 3 via a parallel bus type link. Finally, the GSM chip 2 and the auxiliary chip 1 are interconnected by the data transmission line 8.

The role of the multiplexer 9 is to control priority of access to the screen control module 3 between the MMCC 1 and the GSM chip 2. The multiplexer 9 makes it possible to take account either of the data stream coming from the GSM chip when the terminal is in standby mode, or else the data stream coming from the MMCC in other cases.

For this purpose, the external multiplexer 9 is controlled by a "standby" command which can be driven by the GSM chip, for example. Thus, when the terminal is in standby mode and the user decides to stop ongoing multimedia applications, the "standby" command is applied to the multiplexer 9 by the GSM chip and the data stream taken into account for driving the screen control module is the stream coming from the GSM chip 2. The GSM chip 2 then drives the screen control module 3 while the MMCC 1 is deactivated, thus optimizing energy consumption of the terminal in standby mode. Prior to being deactivated, the companion chip 1 transfers information to the GSM chip 2 via the line 8 so that the GSM chip 2 recovers the context in which the screen was to be found prior to the GSM taking over and driving the screen itself.

Conversely, when the terminal is no longer in standby mode and when the user launches multimedia applications, then the "standby" command is no longer applied to the multiplexer 9 and the data stream taken into account by the multiplexer is the stream coming from the MMCC 1 which then drives the screen control module 3. When the companion chip 1 is activated, data is transmitted over the line 8 from the GSM chip 2 to the companion chip 1 which then continues to drive the screen in such a manner as to take account of the information conventionally processed by the GSM chip concerning field bars, battery states, etc. . . .

Finally, the embodiment of FIG. 5 shows a variant of the embodiment described above with reference to FIG. 4. In this variant, an advance to the conventional GSM chip is implemented in order to minimize the number of components in use. Thus, the multiplexer 9 of FIG. 4 is advantageously integrated in the GSM chip 2, which then nevertheless must have additional inputs/outputs. Otherwise the connections between the various components remain identical to those shown in FIG. 4. Integrating the multiplexer 9 in the GSM chip 2 thus changes nothing functionally from that described above with reference to FIG. 4, but makes it possible to further optimize the architecture of FIG. 4 in terms of costs and compactness, and also makes it possible to optimize the battery life of the terminal in standby mode.

What is claimed is:

1. A radio communications terminal comprising a screen controlled by a control module and also at least two different types of microprocessor, said first type of microprocessor improving the graphics capabilities of said terminal and driving said control module of the screen, said second type of microprocessor handling the other functions of said terminal, the terminal being characterized in that in standby mode said first type of microprocessor is deactivated while second type of microprocessor drives said control module of the screen.

2. A radio communications terminal (10) according to claim 1, characterized in that the control module (3) of the screen (12) has both a parallel interface (5) and a serial interface (4), said parallel interface being connected to the first type of microprocessor (1) via a parallel bus link (7), said serial interface (4) being connected to the second type of microprocessor (2) via a serial bus link (6), and said first and second types of microprocessor (1, 2) being interconnected via a data transmission line (8).

3. A radio communications terminal (10) according to claim 2, characterized in that the first type of microprocessor (1) is dedicated to processing the multimedia functions of said terminal (10).

4. A radio communications terminal (10) according to claim 2, characterized in that the second type of microprocessor (2) is dedicated to processing functions associated with GSM protocol.

5. A radio communications terminal (10) according to claim 1, characterized in that the control module (3) of the screen (12) has a single parallel interface (5), said terminal (10) further comprising an external multiplexer (9) having an output connected via a parallel bus link to said parallel interface (5) of said control module (3) of the screen (12), and first and second inputs connected respectively to the first and second types of microprocessor (1, 2) via parallel bus links, said first and second types of microprocessor (1, 2) being interconnected via a data transmission line (8).

6. A radio communications terminal (10) according to claim 5, characterized in that said second type of microprocessor is formed on a chip and the multiplexer (9) is integrated in said chip.

7. A radio communications terminal (10) according to claim 6, characterized in that the multiplexer (9) is controlled by applying a command (standby) driven by the second type of microprocessor (2) so as to enable said multiplexer (9) to handle access priority to the control module (3) of the screen between said first and second microprocessors (1, 2) depending on whether or not said terminal (10) is in standby mode.

8. A radio communications terminal (10) according to claim 6, characterized in that the first type of microprocessor (1) is dedicated to processing the multimedia functions of said terminal (10).

9. A radio communications terminal (10) according to claim 6, characterized in that the second type of microprocessor (2) is dedicated to processing functions associated with GSM protocol.

10. A radio communications terminal (10) according to claim 5, characterized in that the multiplexer (9) is controlled by applying a command (standby) driven by the second type of microprocessor (2) so as to enable said multiplexer (9) to handle access priority to the control module (3) of the screen between said first and second microprocessors (1, 2) depending on whether or not said terminal (10) is in standby mode.

11. A radio communications terminal (10) according to claim 5, characterized in that the first type of microprocessor (1) is dedicated to processing the multimedia functions of said terminal (10).

12. A radio communications terminal (10) according to claim 5, characterized in that the second type of microprocessor (2) is dedicated to processing functions associated with GSM protocol.

13. A radio communications terminal (10) according to claim 1, characterized in that the first type of microprocessor (1) is dedicated to processing the multimedia functions of said terminal (10).

14. A radio communications terminal (10) according to claim 1, characterized in that the second type of microprocessor (2) is dedicated to processing functions associated with GSM protocol.

* * * * *